United States Patent [19]
DeRees

[11] Patent Number: 5,090,105
[45] Date of Patent: Feb. 25, 1992

[54] MODULAR VEHICLE CONSTRUCTION AND ASSEMBLY METHOD

[75] Inventor: Delbert D. DeRees, Romeo, Mich.

[73] Assignee: Chrysler Corporation, Highland Park, Mich.

[21] Appl. No.: 632,416

[22] Filed: Dec. 21, 1990

Related U.S. Application Data

[60] Continuation of Ser. No. 131,360, Dec. 10, 1987, abandoned, which is a division of Ser. No. 839,873, Mar. 14, 1986, abandoned.

[51] Int. Cl.$^5$ ............................................. B26D 25/00
[52] U.S. Cl. ......................................... 29/469; 29/460
[58] Field of Search ............... 29/430, 460, 469, 791, 29/793, 794, 795, 822, 823, 824; 296/10, 35.3, 102, 183, 185, 187, 192, 193, 194, 195, 196, 197, 203, 204

[56] References Cited

U.S. PATENT DOCUMENTS

| | | | |
|---|---|---|---|
| 2,192,075 | 2/1940 | Gregoire | 296/193 |
| 2,678,231 | 5/1954 | Barenyi | 296/196 |
| 2,757,447 | 8/1956 | Barenyi | 29/430 |
| 2,909,128 | 10/1959 | Keen | 29/824 X |
| 3,021,172 | 2/1962 | Fiala et al. | 296/203 |
| 3,034,823 | 5/1962 | Himka et al. | 296/204 |
| 3,541,668 | 11/1970 | Wessells, III et al. | 29/469 |
| 4,033,033 | 7/1977 | Heffner | 29/469 X |
| 4,422,685 | 12/1983 | Bonfilio et al. | 296/197 |
| 4,441,645 | 4/1984 | Takagishi et al. | 228/47 |
| 4,597,461 | 7/1986 | Köchy et al. | 296/197 X |
| 4,730,870 | 3/1988 | DeRees | 296/197 |

FOREIGN PATENT DOCUMENTS

913631 5/1950 France .
2067480 7/1981 United Kingdom ............... 296/197

Primary Examiner—Joseph M. Gorski
Attorney, Agent, or Firm—Harness, Dickey & Pierce

[57] ABSTRACT

A vehicle construction comprises a series of modules which can be individually fabricated and assembled to include vehicle operating components before the modules are combined in the final assembly of the vehicle. An underbody module, including a passenger platform preferably integrally constructed with a chassis frame, is a support structure for the remaining modules. A second module comprising a cowl having a windshield frame integrally constructed with a dash panel frame provides structural support for vehicle controls and adjacent modules or body panels. Preferably, the underbody and cowl modules are joined by additional structural supports to form a cage enclosing passenger area of the vehicle. A third module encloses the vehicle area in front of the passenger compartment and a fourth module encloses the area behind the passenger compartment. The modular construction permits assembly by means of a plurality of subassembly lines, each of which pertains to the construction of a single module. In one form, the assembly method involves subassembly lines that intersect a single final assembly line. In such an assembly system, the individual modules can be arranged for simultaneous application of a finishing coating prior to the introduction of each module structure to a subassembly line for installation of a set of vehicle components. Alternatively, one or more of the subassembly lines may be remotely located with respect to the final assembly line, and the number of subassembly lines used to construct each individual module can be multiplied as necessary for efficient production.

19 Claims, 5 Drawing Sheets

MODULAR VEHICLE CONSTRUCTION AND ASSEMBLY METHOD

This is a continuation of U.S. patent application Ser. No. 07/131,360, filed Dec. 10, 1987, and now abandoned which is a divisional of Ser. No. 06/839,873, filed Mar. 14, 1986, and now abandoned.

BACKGROUND OF THE INVENTION

I. Field of the Present Invention

The present invention relates generally to motor vehicle constructions, and more particularly, to a vehicle construction in which modular sections are fabricated and assembled with operating components before the individual modules are mounted together to form a complete vehicle.

II. Description of the Prior Art

The construction and assembly of a motor vehicle is a complex project due to the large number of components which must be manufactured, assembled and installed to produce the finished motor vehicle. Although the use of an assembly line to produce vehicles of a particular model has organized and increased the efficiency of motor vehicle production, there are a large number of operations which must be performed on the assembly line. Therefore, a problem occurring at any point along a continuous assembly line can substantially affect the output production of the entire assembly line.

Moreover, in view of the fact that each vehicle may be differently constructed from vehicles of the same model due to the demand for different functional components, optional equipment, trim style and color, the actual production operation performed at each station of the assembly line may differ for each vehicle-in-production. Consequently, mass production of a particular vehicle model can be further complicated. Nevertheless, it has been typical to utilize a continuous, comprehensive production line for each model of motor vehicle produced by a manufacturer. Although the actual construction of the various components which are mounted to the vehicle-in-production as it proceeds along the production line may be performed apart from the assembly line facility and process, the timely supply of such components at the necessary station of the production line has a substantial effect on the entire production of the vehicles on the assembly line.

Although timely mounting of vehicle components at each station along a production line has been aided by the introduction of mechanized and robotic devices which can be programmed to repeatedly perform various manufacturing processes along the assembly line, even when the processes are subject to change for each vehicle being constructed, the production rate of the entire assembly line is dependent upon proper operation of each individual station along the assembly line. Moreover, as more and more parts are added to the vehicle-in-production, the installation and assembly of other components becomes more complicated. . In particular, previously attached assemblies can interfere with free access to the areas at which additional parts are to be mounted or installed, and can substantially increase the difficulty of performing the necessary operations.

A particularly troublesome feature of previously known assembly lines is that the application of corrosion resistant coatings such as the application of paint is a particularly time consuming operation. Not only must the paint be applied in an even and comprehensive manner, but the paint or other coating must be dried or cured before additional assembly can continue. Moreover, repeated painting operations create substantial control problems with overspray and the release of chemical solvents.

It has been known to apply the final paint coating only after all the major parts of the vehicle have been assembled. However, such a process requires that portions of the vehicle be masked to prevent undesirable overspray, it prevents the application of paint on unexposed areas of the vehicle, and requires a substantial amount of dedicated floor space. Alternatively, it has also been known to construct a body assembly from a plurality of stamped panels which have been welded together, separately and apart from construction of the vehicle chassis, so that the body assembly can be fully coated. In addition, such a body assembly can be immersed in an electroplating bath to provide improved corrosion resistance. However, if other exterior components such as doors are unable to be coated at the same time as the assembled body panels, it is necessary to assure that the finish used to coat the doors does not differ substantially from the finish coating applied to the other panels in order to provide the finished vehicle with a proper consistent appearance. Moreover, a large amount of dedicated floor space is still necessary for a complete body.

In addition, the interest in producing sturdy but lightweight vehicles to improve the handling characteristics and fuel economy of motor vehicles can substantially affect production line assembly of motor vehicles. For example, although it has been known to utilize body panel structures as support structures to reinforce the chassis frame of a motor vehicle, the assembly of the body structure together with the chassis frame can substantially interfere with the installation of the drive train, running gear and other components such as passenger compartment instrumentation which are necessary to produce a complete vehicle. In particular, access to the locations at which such components are installed can be severely restricted by the body panels. Moreover, the previously mentioned problems of paint matching and painting time are equally troublesome in production line assembly of motor vehicles of this type.

SUMMARY OF THE PRESENT INVENTION

The present invention overcomes the above-mentioned disadvantages by providing a modular vehicle construction and assembly method in which various structural modules are fabricated and assembled with operating vehicle components prior to mounting with other fabricated and assembled modules. The modular vehicle construction of the present invention permits the production line assembly method to be modified by segmenting of the production line and shortening of the final production assembly line. In one form of the assembly process, vehicle production can be premised upon completion of a consolidated application of finish to individual module structures prior to assembly of vehicle components on the modules and combination of the modules. In another form of the assembly process, separate modules may be independently completed at a location remote from the final assembly line if it is advantageous in the overall manufacturing processes, for example, to meet local-content requirements of a sovereign state's laws. One particular construction of the modular vehicle of the preferred embodiment, includes an underbody module which provides exterior panels used to separate the other modules, whereby independently coated modules can be combined on a vehicle without adversely affecting the overall finish appearance of the completed vehicle.

In general, the modular vehicle construction of the present invention comprises a first module having a chassis frame and a passenger platform which is used in the formation of the underbody of the vehicle. A second module in the form of a cowl includes a structural frame, preferably formed from stamped panel components, that includes a windshield frame portion integrally formed with a dash panel frame portion. A third module comprises a flooring platform, two first side wall structures and at least one closure means extending across the first side wall structures above or at one end of the flooring platform. A fourth module comprises two second side wall structures, reinforcement means for supporting the second side wall structures in a fixed position with respect to each other, a hood panel and means for displaceably mounting at least a portion of the fourth module to the first module. Each of the first through fourth modules is completely assembled, including the installation of vehicle operating components, prior to its attachment to the other modules.

The vehicle structure also includes means for encaging the passenger compartment of the motor vehicle. The encaging means can be formed by a fifth module or by separate components including a pillar arch adapted to be mounted on a reinforced portion of the passenger platform of the first module. The pillar arch is also interconnected with the cowl module which is also supported on a reinforced portion of the passenger platform.

Each of the modules is subject to variation even within the same model line to provide a variety of body styles for each model of motor vehicle chassis produced as well as a variety of optional accessories. In the preferred embodiment, the modular vehicle assembly is incorporated in a front engined, two wheel drive vehicle. However, it is to be understood that the particular construction and shape of each module can be varied within the scope of the present invention to be useful with other engine placements and drive train modifications such as four wheel drive. Similarly, the structures are subject to novel and differing assembly line methods as will be discussed in greater detail hereinafter.

Each basic module is preferably fabricated by stamping predetermined panels and securing the panels together to form discrete basic modules. The means for securing the panels together, like the means for securing certain modules together, can comprise conventional welding techniques or welding substitutes such as mechanical interlocking of the panels, mechanical fasteners, bonding with adhesives, bolting, riveting or the like. It is to be understood that the term bonding used hereinafter is to be broadly interpreted to refer to any and each of these securing techniques, as well as combinations of these techniques, and is not to be considered limited as a reference to a particular type, even though details of the connections used in the preferred embodiment are discussed.

In one assembly method of the present invention, a fabricated basic module of each type is then collected and consolidated with the other modules as a unit for finishing. As used in this application, the terms finish and finishing refer to the application of corrosion protection, electroplating compositions, finishing paint or other coatings that may be used to protect the panels or provide them with a desirable appearance. The finished modules are then sequentially introduced into independent subassembly lines wherein sets of vehicle components are installed on the individual modules to complete their assembly. Each of the subassembly lines terminates at a final assembly line along which the completed modules are joined together to form a complete vehicle.

The consolidated finishing of individual modules before attachment of the vehicle components substantially eliminates the previously known interruption of assembly line procedures with the lengthy process of applying a finish to body parts of the vehicle. Moreover, such a preliminary procedure avoids the need for wholly constructing a vehicle body separately and apart from the chassis as in some previously known vehicle assembly methods. Furthermore, since the modules are separate from each other, they can also be individually introduced into a painting station such as an electroplating bath. As a result, the overall size and volume of the finish application station can be minimized even when the parts are coated in a common bath. For example, the underbody and other modules can be tipped on their sides for immersion in the bath so that the width, and thus, the dedicated floor space, volume and electrical energy requirements can be reduced.

Another method by which a modular vehicle can be assembled provides flexibility in determining how and where portions of the motor vehicle are to be produced. Unlike previously known vehicle production processes, the present invention permits independent construction of each or any of the vehicle modules with respect to the final assembly line. Each of the modules can be fabricated and completely assembled to include various vehicle components while it is at a different location remote from the final assembly line, as desired. Moreover, the basic modules can also be provided with finishing at that remote location prior to the installation of the set of vehicle components which completes a module's construction.

Although color shades of finish coatings utilized in constructing individual modules at different locations may differ slightly from batch to batch, such differences can be made imperceptible on one form of the vehicle of the present invention by the construction of the modules and the manner in which they are connected to -each other about the encaged passenger area. However, it may still be advantageous to provide a common application of finish coating to the modules forming the passenger compartment cage. Nevertheless, when the encaging components which separate the other body panel modules from each other are finished in a neutral or accent color, differences in the shade or tint of the batch for each of the body panel modules cannot be readily detected. Thus, the application of a color such as black, silver or grey to the encaging components of the vehicle permits the remaining body modules to be painted any color desired without the need for exact matching of the color shades applied at the independent and remote assembly location of the individual body modules. Alternatively, the body panel modules can be constructed to overlap the passenger compartment cage and provide a conventional automobile appearance.

Thus, the present invention provides a novel modular vehicle construction which is easy to produce and which provides a strong, high loadbearing capacity structure which is lightweight and easy to assemble. In addition, the modular construction provides flexibility in production. For example, the module construction permits greater use of automated or computerized production equipment which require less mobility and thus, less complicated construction than automated production equipment previously used to assemble and install parts of motor vehicles. Moreover, utilization of labor when facility and manpower are available is easily accommodated because assembly and construction are simplified substantially. Moreover, the modular construction minimizes the need for consolidating all of the assembly operations required to construct a complete motor vehicle at a single assembly location.

Furthermore, the modular body construction of the present invention permits but eliminates the need for a simultaneous application of finishing to the body panel modules used in the construction of a single vehicle. The assembly methods also provide the advantage of segmenting individual module constructions to form complete assemblies which can be interconnected at a substantially shorter final assembly line than previously known motor vehicle assembly methods. In addition, the assembly process can be premised upon completion of the time consuming and interruptive step of applying finishing to the vehicle structures.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which.

DETAILED DESCRIPTION OF A PREFERRED EMBODIMENT

Figures 4, 9:
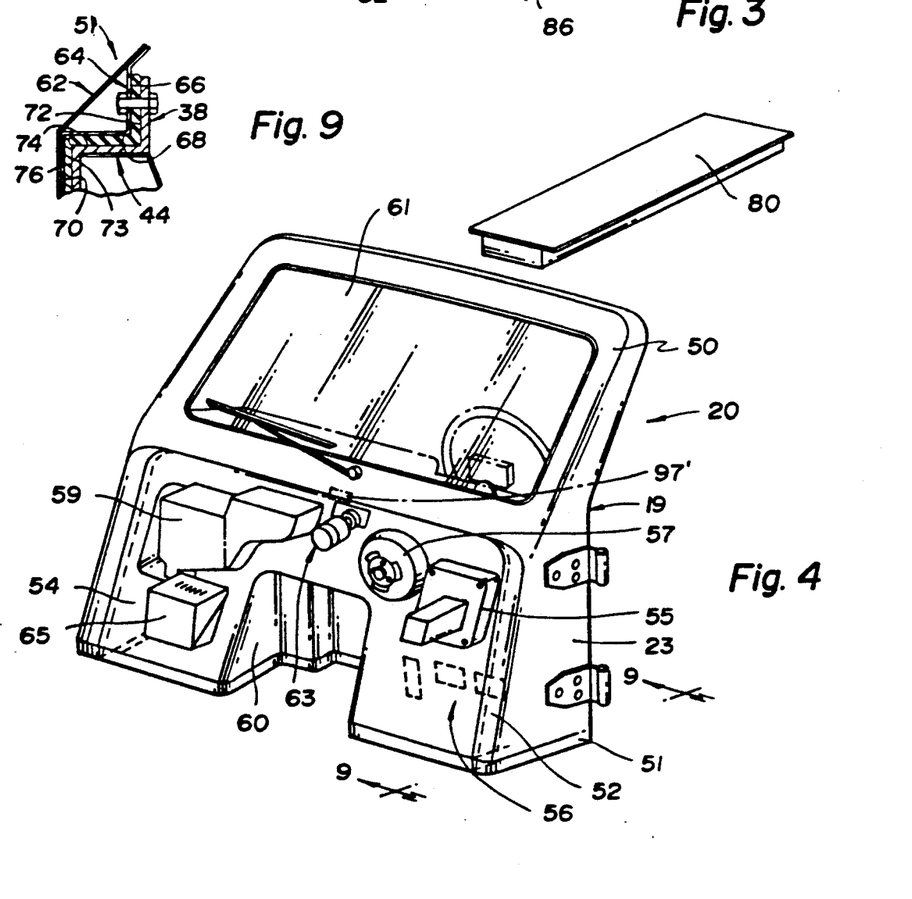
FIG. 4 is a perspective view of another module of the vehicle construction of the present invention.
FIG. 9 is an enlarged, fragmentary, sectional view taken substantially along line 9—9 in FIG. 4.
Figure 5:
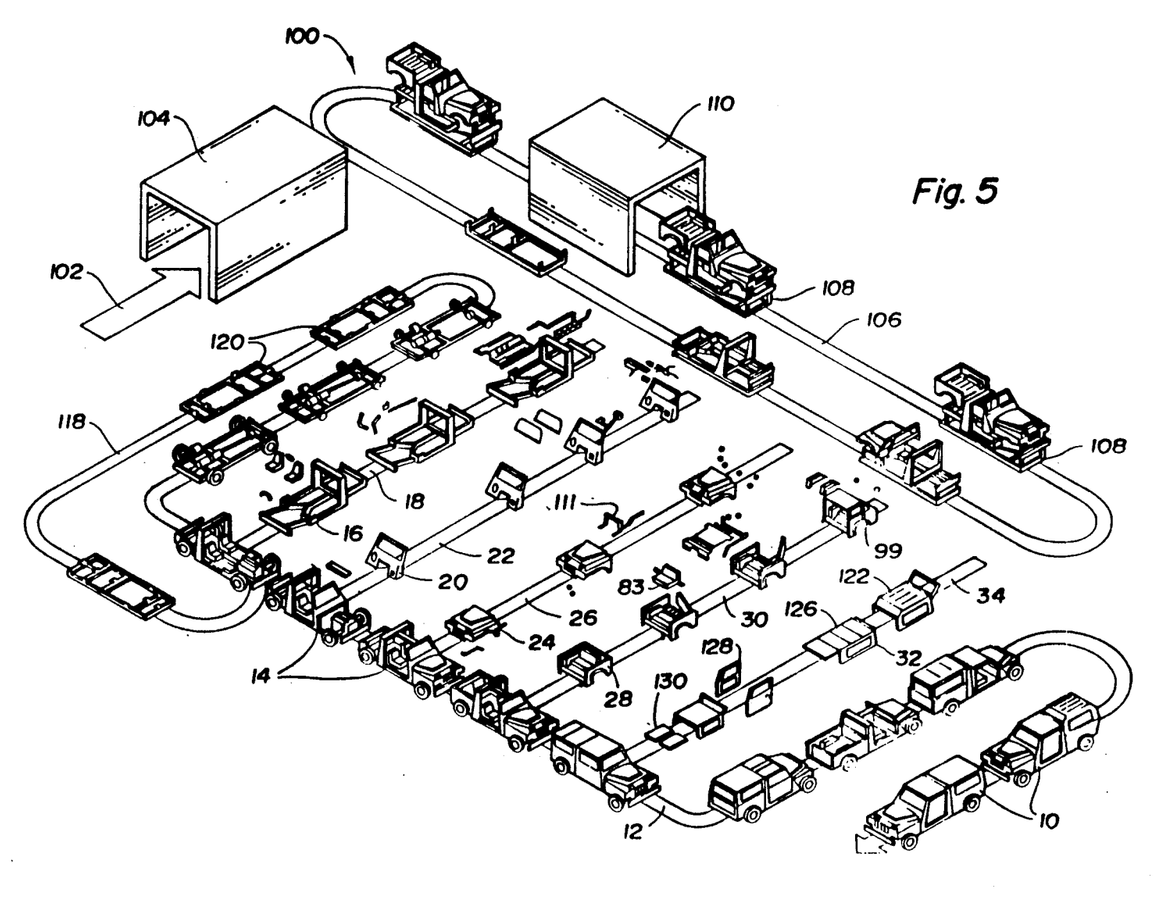
FIG. 5 is a diagrammatic view indicating assembly methods applicable to the modular vehicle construction of the present invention.

Referring first to FIG. 5, a plurality of motor vehicles 10 constructed in accordance with the present invention are shown in completed form exiting a final assembly line generally designated at 12. The final assembly line 12 includes a plurality of vehicles-in-production 14 made up of a plurality of individual modules. A first module 16 is produced on a first independent assembly line 18 and is shown in greater detail in FIG. 1. A second module 20 is assembled on an independent assembly line 22 and is shown in greater detail in FIG. 4. A third module 24 is independently assembled on a subassembly line 26 and is shown in greater detail in FIG. 3. Similarly, a fourth module 28 can be independently assembled on a subassembly line 30 and is shown in greater detail in FIG. 2. In addition, a fifth module 32 can be independently assembled on an independent assembly line 34 as will be described in greater detail hereinafter.

Each of the subassembly lines 18, 22, 26, 30 and 34 and its production operations may vary throughout a wide range within the scope of the present invention. However, at least four modules are shown applied to each vehicle 10 produced in the preferred embodiment of the present invention. Nevertheless, the basic features of each module, and the assembly features of each module are best described individually with respect to FIGS. 1-4 before discussing the preferred assembly processes and variations within the scope of the present invention.

Figure 1:
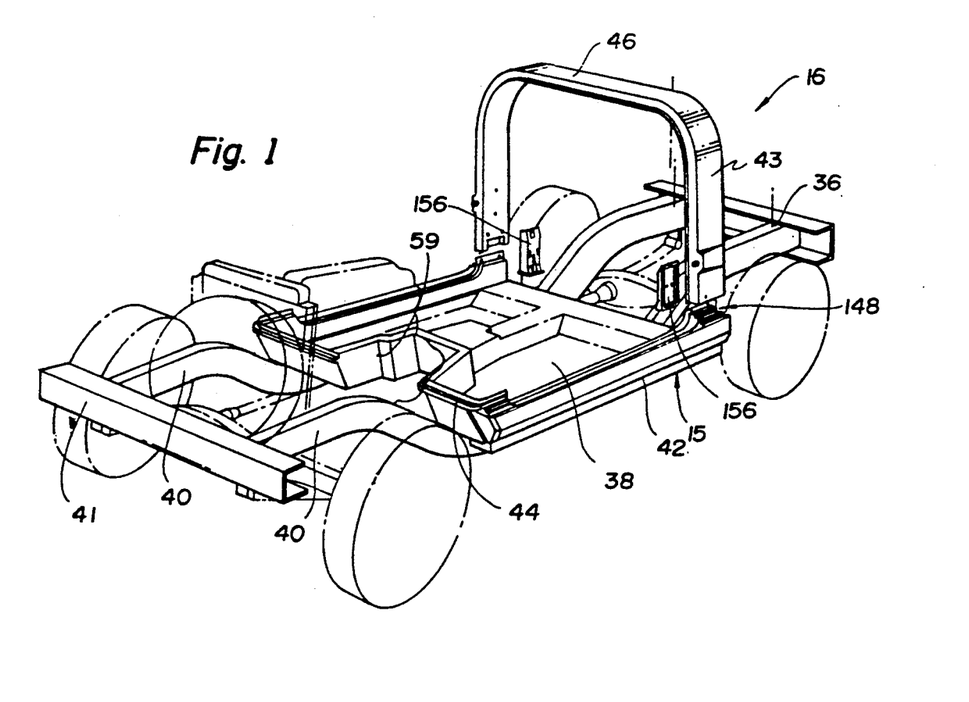
FIG. 1 is a perspective view of a first module of a motor vehicle construction of the present invention.

Referring now to FIG. 1, the first module 16 comprises a basic module 15 having a chassis frame 36 and a passenger platform 38. The chassis frame 36 comprises a pair of frame rails 40 in a spaced, parallel arrangement which can be interconnected by cross-members, for example, the end beams 42 which permit the mounting of a shock absorbing bumper to the chassis frame 36. However, in the preferred embodiment, the rails 40 are integrally joined with the passenger platform 38 by being sandwiched between an upper panel and a lower panel used to form the passenger platform 38.

Figures 6, 10:
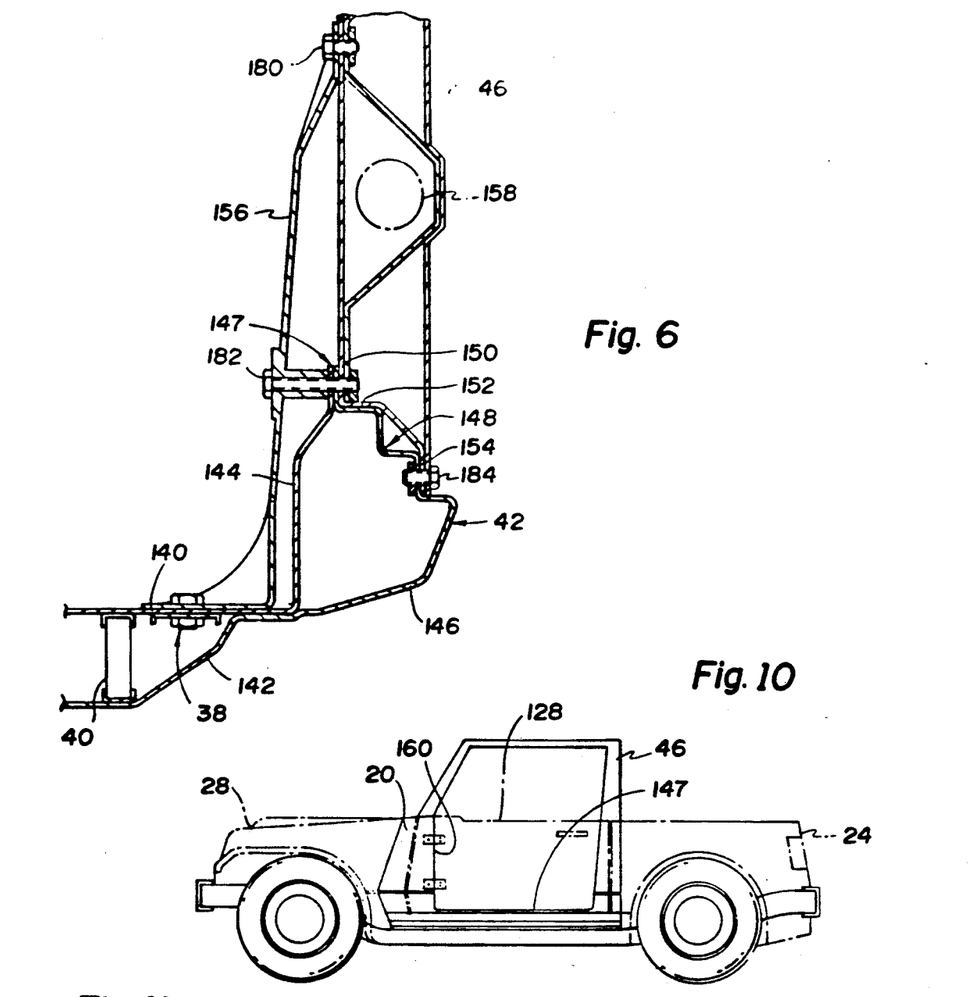
FIG. 6 is an enlarged, fragmentary, sectional view taken substantially along line 6—6 in FIG. 1.
FIG. 10 is a side plan view similar to FIG. 7 but showing a modification of the vehicle according to the present invention.

Preferably, as shown in FIG. 6, the rails 40 are welded or otherwise secured between the panel 140 and 142. In addition, the sandwiching panels 140 and 142 include mating, configured end flanges 144 and 146, respectively, which form a reinforcement beam in the form of a rocker panel 42 at each side of the platform 38. Each flange 144 and 146 terminates in a pinch-weld flange 147. The platform 38 also preferably includes a reinforcement beam 44 (FIG. 9) formed by shaped panel portions at the front of the passenger platform 38 as will be described in greater detail with respect to FIG. 9. The reinforcement beam 44 follows the configuration of the front of the platform 38 which includes a drive train tunnel recess 59 as shown in FIG. 1. The actual construction of the reinforcement beams 42 and 44 can be modified so long as the reinforcement beams 42 and 44 of the passenger platform 38 are positioned on the passenger platform 38 for alignment and attachment with the other components of the modular vehicle of the present invention, since they serve as a foundation for the means for encaging a passenger compartment. Additional details will be discussed as the invention is described in greater detail hereinafter.

A further feature of the first module 16 in the preferred embodiment of the present invention comprises a pillar arch 46. While the pillar arch 46 forms a portion of the encaging means to be described in greater detail hereinafter, it is also to be understood that the pillar arch 46 can form a portion of a separate module, such as a module 32 shown in FIG. 5. Nevertheless, the attachment of the pillar arch 46 on the passenger platform 38 is an important feature of the vehicle construction in the preferred embodiment, and thus the pillar arch can be best referred to in this detailed description with respect to construction of the underbody module 16.

While the pillar arch 46 of the preferred embodiment is advantageously constructed as a composite of stamped sheet components in the manner taught in copending U.S. Patent Application of the same inventor, Ser. No. 839,799, entitled Frame Rail and Underbody Construction, filed Mar. 14, 1986, a tubular beam, channel rail or other rail construction can be used to form the pillar arch 46. In any event, depending leg portions of the pillar arch 46 are rigidly secured at their ends to a stepped portion 148 (FIGS. 1 and 6) of the rocker panel 42. As best shown in FIG. 6, the stepped portion 148 on the rocker panel 42 includes alignment and bonding surfaces 150, 152 and 154 which mate with corresponding surfaces on the ends of the pillar arch 46.

While each pair of mating surfaces can be bonded together, at least two of the mating surfaces are bonded together as shown by fasteners 182 and 184 in FIG. 6. In addition, a support member 156 is secured to the pillar arch 46 and the platform 38 on the inside of the rocker panel 42. While additional details of the manner in which the pillar arch 46 of the preferred embodiment is mounted to the platform 38 are provided in copending Application Ser. No. 839,799 previously referred to, it is sufficient for the sake of the present invention to note that the support member 156 is secured to the pillar arch 46 at a position above the support area for a door latch striker indicated diagrammatically at 158 in FIG. 6, and stably supported upon the upper panel 140. The inner support member 156 can be mechanically or adhesively bonded to these structures substantially along its entire facing surface. In the preferred embodiment, at least one mechanical fastener 180 secures the inner support member to the pillar arch 46 above the striker pin area. In addition, two fasteners 182 (one shown) extend through a bosses in the inner support member 156, the pinch-weld flange 147 and portions of the pillar arch 46 to join the support member 156, rocker panel 42 and pillar arch 46 together.

Referring now to FIG. 4, the second module 20 is thereshown comprising a basic module 19 having an upper windshield frame 50 integrally formed with a lower dash panel frame 52. In addition, a dash panel 54 covers the dash panel frame 52, and can be reinforced as necessary to support a plurality of vehicle components to be discussed in greater detail hereinafter. The integral frame structure of the basic cowl module 19 is preferably formed with a pair of mating, stamped panels as indicated at 62 and 64 in FIG. 9, includes reinforcement beams made of mating channel portions formed in the mating panels. Regardless of the manner in which the module 19 is actually fabricated, the basic module 19 forms a rigid supporting structure meeting Federal Motor Vehicle Safety Standards with regard to windshield retention, roof crush, and front impact. Moreover, the basic module 19 is adapted to mate with and fixedly engage the passenger platform 38 and is bonded thereto. Accordingly, the basic cowl module 19 of the preferred embodiment includes a cowl lip 51 which matingly engages the reinforcement beam 44 of platform 38.

A preferred construction for the cowl lip 51 is shown in FIG. 9, wherein the cowl module 19 includes an outer panel 62 and an inner panel 64. The inner panel 64 is formed to include alignment and bonding surfaces 66, 68 and 70 adapted to mate with correspondingly aligned surfaces 72, 74 and 76 on the passenger platform 38. At least two of the mating surfaces are bonded together and the bonded surfaces are preferably, angularly aligned with respect to each other to form a bonded connection along two intersecting planes. Such bonding forms a strong stable connection between the cowl module 20 and the under body module 16, and is preferably used to secure other modules together as desired. Thus, at least the surfaces 66 and 72 as well as 68 and 74 are bonded together, or at least the surfaces 68 and 74 as well as 70 and 76 are bonded. In FIG. 9, a bond is diagrammatically indicated at 73 for all three sets of surfaces and includes mechanical as well as adhesive bonding.

Moreover, the basic cowl module 19 preferably includes a tunnel recess 60 adapted to receive a drive train housing or the like so that the cowl is in close proximity with the forward portion of the drive train and to the cowl structure. Furthermore, the cowl lip 51 follows the configuration of the tunnel recess 60 to further strengthen the module 19, whereby the edge of the peripheral wall defining the recess 60 matingly aligns with the reinforcement beam 44 for attaching the cowl module 20 to the passenger platform 38.

As also shown in FIG. 4, a cross bar 80 can be used in conjunction with the cowl module 20 and the pillar arch 46 (FIG. 1) to encage the passenger area above the passenger platform 38. Preferably, the bar 80 is constructed in substantially the same manner as the pillar arch 46. However, it is to be understood that the actual construction of the cross bar 80 can be varied within the scope of the present invention so long as it provides for rigid support between the cowl module 20 and the pillar arch 46 at a position . spaced apart from the passenger platform 38. Preferably, the cross bar 80 is secured at the top of the windshield frame portion 50 of the cowl module 20 and at the top of the pillar arch 46 by welds, bolts, adhesive or equivalent fastening means.

Moreover, although the preferred embodiment discloses a cross bar 80 constructed separately from the pillar arch 46, it is to be understood that each of these components can be integrally formed in a separate module such as the modules shown on assembly line 34 in FIG. 5 to be described in greater detail hereinafter.

Figure 3:
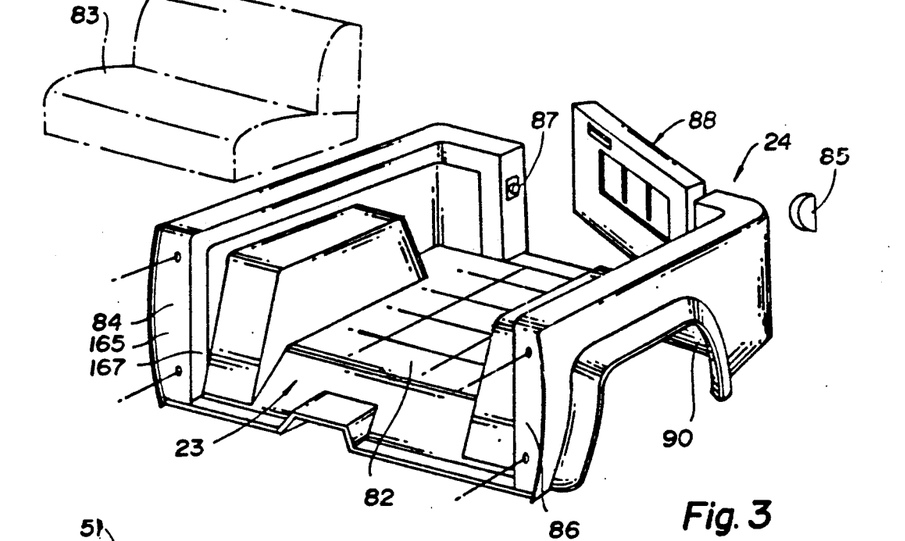
FIG. 3 is a perspective view of another module of the vehicle construction of the present invention.

Referring now to FIG. 3, a third module 24 is thereshown comprising a basic module 23 having a flooring platform 82 and a pair of side wall structures 84 and 86. In addition, a basic module 23 includes a closure means. In the preferred embodiment, the closure means comprises a tailgate 88 hinged at one side to a rear panel portion of the side wall structure 86 and provided with locking means on the other side. For example, the tailgate 88 includes a latch mechanism corresponding with a striker pin mounted on a rear wall portion of the side wall structure 84. Of course, modifications can be made to each of these panel structures so long as the module defines a partially enclosed area which can be provided with accessories for seating passengers or holding cargo. For example, the closure means can also be in the form of a pivoting trunk lid, or a wall panel fixedly secured across the side wall structures, or even a roofed body portion open only at its forward end toward the encaged passenger area. As shown in FIG. 5 at 99, a roofed module including side door openings and means for hingedly mounting door panels in the opening is also within the scope of the present invention and represents a four-door style vehicle construction. Nevertheless, since this module is not intended to form part of the support structures for the vehicle drive train, its construction and styling can be varied throughout a wide range. Accordingly, additional components such as the fender well 90 can be formed with the side wall structures or can be separately formed and assembled to the module 24 as will be described in greater detail hereinafter.

Figure 2:
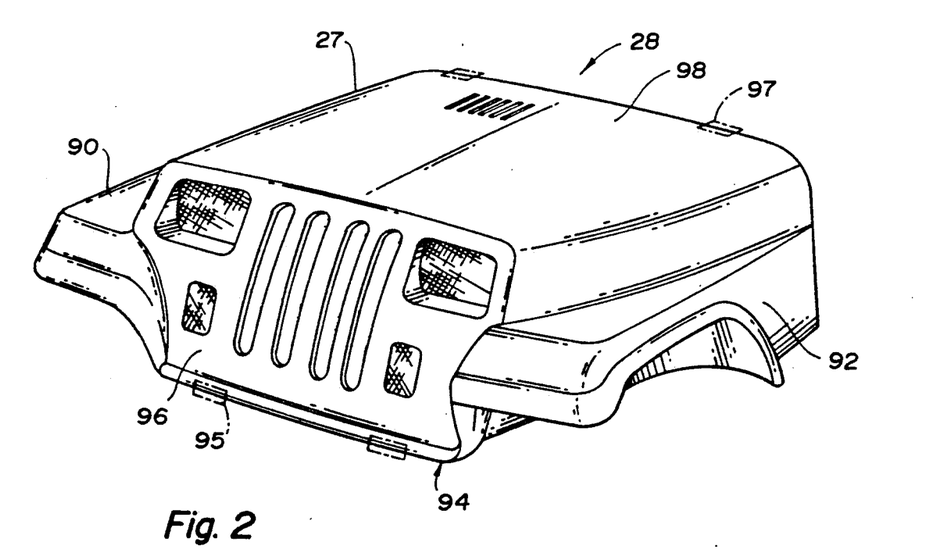
FIG. 2 is a perspective view of another module of the vehicle construction according to the present invention.

Referring now to FIG. 2, a fourth module 28 is shown comprising a basic module structure 27 having a pair of side wall structures 90 and 92 and means 94 for fixedly positioning side structures 90 and 92 in a fixed position. In the preferred embodiment, a grille panel 96 is secured to the side wall structures 90 and 92 to retain the side structures in a fixed position relative to each other. In addition, the basic module 27 includes a hood 98 also secured in a fixed position with respect to the side structures 90 and 92. In the preferred embodiment, the entire module 27 is attached by hinge means 95, or alternatively 97, so that it can be opened to expose the area normally covered by the hood 98 and the side wall structures 90 and 92.

In any event, at least a portion of the module 28 is displaceably mounted with respect to the underbody module 16 to provide access to the area enclosed by the housing. Thus, in an alternative construction, the hood 98 can be pivotally secured with respect to the sidewall structures 90 and 92, for example, by hinges mounted on the grille structure 96. Of course, the opposite end of the displaceable portion includes a latch mechanism adapted to engage a corresponding latch portion on an adjacent module. For example, in the preferred embodiment, where the entire module is pivoted at 95, latch means may be positioned at 97 to engage a corresponding latch portion 97' (FIG. 4). Regardless of whether the hood 98 or the entire module 19 is displaceably mounted, the module 28, like the third module 24, is not intended to form part of the support structure for the vehicle drive train, and can be constructed in a variety of ways and styles.

Having thus described the four basic module structures required in accordance with the present invention, additional details of the module constructions and the process for constructing a vehicle with the basic modular constructions can be described. In a first, generally consolidated production process 100, the panels, rails and the like used to form the basic modules for the vehicle are formed in a operation such as metal stamping as diagrammatically indicated at 102. The modules are then assembled as diagrammatically indicated at 104 to complete fabrication of the basic modules. A set of basic modules to be incorporated in a single vehicle is then collected and delivered as a unit to a finishing station 110. At the finishing station 110, an application of corrosion protection of any desired type can be applied. In the preferred embodiment, the finishing is in the form of an electroplating paint.

As shown at 106 in FIG. 5, an application line can include a plurality of carriages 108 adapted to support each group of modules in a fixed arrangement which passes through the finishing station 110. At the finishing station 110, each of the modules on a carriage 108 is completely coated with paint from the same batch to provide a consistent and matching coating to each of the modules for a vehicle-in-production 14. When the finish application has been completed, the finished basic modules are delivered by the carriage 108 for sequential introduction into subassembly lines such as the lines 18, 22, 26, 30 and 34. In each of the subassembly lines, a basic module is provided with a set of vehicle components which are assembled to the module to form a completed module. The sets of vehicle components to as applied in each subassembly line can be varied as desired for each basic module completed therein.

In the consolidated process 100, the subassembly line 18 used to complete an underbody module 16 includes the installation of the exhaust conduit system, a finish flooring such as carpeting and seats for passengers on the passenger platform. In addition, the subassembly line 18 can include attachment of the drive train and running gear to the module 16. In the preferred embodiment, a companion line 118 includes a plurality of carriages 120 upon which the drive train and running gear are arranged in proper alignment so that they can easily be incorporated on the underbody module 16. The companion line 118 and subassembly line 18 meet at the first station of the final assembly line 12 where the carriage arrangement of engine, transmission, transfer cases, suspension system and brake system desired for a particular vehicle can be directly transferred to and assembled on the basic module 15 to form a completed module 16. The carriage 120 is returned to the companion line 118 to receive another drive train and running gear set for another vehicle, as the completed module 16 proceeds toward the next station on the final assembly line 12.

At subassembly line 22, a second set of a plurality of vehicle components are installed on the basic cowl module 19 to form the completed module 20. As shown at FIG. 4, the completed module 20 includes a plurality of components including a steering column assembly 55 with a steering wheel. In addition, brake pedal, throttle pedal, and if necessary, clutch pedal mechanisms as indicated generally at 56, and a power brake booster assembly 57 are also installed. Furthermore, an instrument panel 58 complete with gauges and other optional accessories which may be desired as well as complete electrical switches for operating such components as the headlamps, windshield wipers, horn and the like, is assembled to the basic module 19.

In addition, module 20 includes an environmental control unit 59 including a complete heater-defroster system as well as ventilation ducts. Furthermore, windshield glass 61 is installed within the windshield frame 50 and the windshield wiper system 63 is also mounted on the module. Moreover, all body and engine related electrical components, such as a storage battery 65, are assembled with the basic module 19 along with any other additional accessories or controls which are to be accessible from the passenger compartment to form a completed cowl module 20. The completed cowl module 20 is then introduced to the final assembly line 12 wherein the second module 20 is mounted to the first module 16. This mounting step preferably includes the installation of the cross bar 80 between the cowl module 20 and the pillar arch 46.

Completion of the vehicle module 24 along subassembly line 26 can include the installation of fender wells and well extensions. A reinforcement frame 111 may be installed, particularly when the module is of the type in which the hood is displaceably mounted with respect to the side wall structures, and the side walls must be stabilized independently of the -hood. In addition, the assembly on line 30 includes installation of the headlamps, turn indicator lamps, and other lights desired. Similarly, additional optional components such as mud flaps and trim can be applied in the subassembly line 26.

The subassembly line 30 includes the installation of finished flooring to the flooring platform 82, seats 83 or luggage carrying accessories, rear tail lamps 85 and other optional accessories and trim. Both subassembly lines 26 and 28 provide completed modules 24 and 28, respectively, to stations at the final assembly line 12 where the completed modules are mounted to the first module 16.

As also shown in FIG. 5, an optional body subassembly line 34 is used for the production of additional body panels or modules. For example, when the completed module 24 is an open-topped module, a closure cap 122 can be constructed along subassembly line 34. Moreover, the cap can be fabricated in a modular construction which also forms a vehicle roof adapted to fit over the encaged passenger compartment as shown at 126. Furthermore, it is possible that the cross bar 80 forming part of the engaging means is assembled within a vehicle roof module. Nevertheless, for the sake of uniformity in construction, it is preferable that the body members constructed at subassembly line 34 be constructed as non-supporting members which fit over the encaging structure previously completed on the final assembly line 12.

Furthermore, doors 128 can be fitted to the module 126 or separately mounted to the vehicle-in-production 14 intermediate the pillar arch 46 and the cowl module 20. In addition, other body panel enclosures such as removable tops 130 which fit into the area extending between the pillar arch 46 and the cowl module 20 can be assembled to complete the vehicle-in-production 14 at the final station of the final assembly line 12.

Of course, it is to be understood that the assembly process is subject to numerous modifications without departing from the scope of the present invention. In particular, since the assembly processes of the underbody module 16 and the cowl module 20 may be substantially more extensive and time consuming than construction of the modules 28 and 24, it can be appreciated that each subassembly line 18-34 may be an independent assembly line rather than a parallel assembly line as shown in FIG. 5. For example, each subassembly line may be extended to include a stamping operation 102, a framing operation 104 and a corrosion protection and paint operation 110 in each individual line. Moreover, the lines may be independently and remotely located from the final assembly line 12, for example, in a different plant, and the number of subassembly lines producing the same modules may be multiplied as desired to achieve a particular production capacity. In addition, it may be appreciated that differences between the body panel structures, such as the doors and roof panels referred to in subassembly line 34, may require that the panels be constructed at different locations and merely consolidated in an orderly manner on subassembly line 34 for sequential installation at the final assembly line 12. In any event, it will be understood that the final assembly line will require only a limited number of stations to complete construction of the entire modular vehicle.

Furthermore, the subassembly line 18 may be extended by incorporating the production operations performed on company line 118 within the subassembly line 18. Moreover, each subassembly line, and in particular subassembly line 22, may be modified to include testing operations which insure that all of the electrical and mechanical components assembled to the module are in proper working order before the module is mounted on the underbody module 16 at the final assembly line 12. It may also be appreciated that multiplication of subassembly lines is particularly desirable for timely production of the structural modules 16 and 20 which also include the most functional components, since they must meet structural standards as well as the performance standards for the assemblies mounted on them. On the other hand, the nonsupporting structural modules such as 24, 28 and 32 can be assembled on a more limited number of assembly lines.

Figure 7:
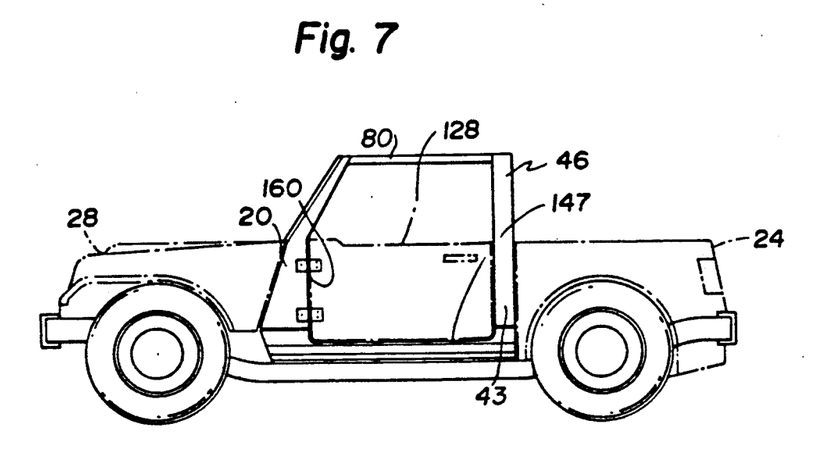
FIG. 7 is a side plan view of a vehicle including the modules of FIGS. 1-4.
Figure 8:
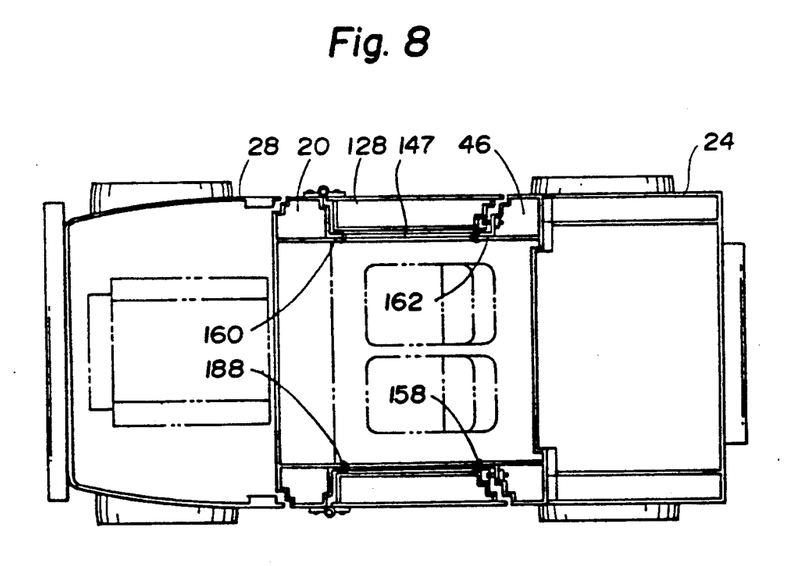
FIG. 8 is a sectional plan view of the vehicle shown in FIG. 7.

Moreover, it can be appreciated that individual finishing of each of the modules may have been heretofore undesirable to the extent that mis-matching of the paint may be noticeable when independently painted modules are mounted adjacent to each other. However, as shown in FIGS. 7 and 8, the pillar arch 46 can include a peripheral finish surface 43 which extends between cover or exterior panels such as a door 128 and module 24. Similarly, the cowl 20 can include a peripheral surface 23 (FIG. 4) extending between a door panel 128 and the fourth module 28. As a result, slight shading differences between the paint applied to the module 24, the module 28 and the intermediate panels 128 can be made imperceptible by the fact that they are separated from each other by another panel. In such a case, the intermediate panel portions 43 and 23 are preferably provided with a neutral or accent color such as silver or gray during treatment of the underbody and cowl modules, whereas the remaining modules and panels are provided with optional colors. Accordingly, a distinctive but apparently consistent color scheme is applied to the vehicle. Preferably, the neutral coloring is simultaneously applied to the basic module 15, the cowl module 20 and the cross bar 80 of the encaging means to avoid inconsistency in the finish appearance of the exterior surfaces of the cowl module 23, rocker panel 42 and pillar arch 46. Nevertheless, the separation of the pillar arch 46 from the peripheral exposed sides of the cowl module 20 may be sufficient to avoid detection of slight differences in color shades of the paint applied to these modules.

Figure 11:
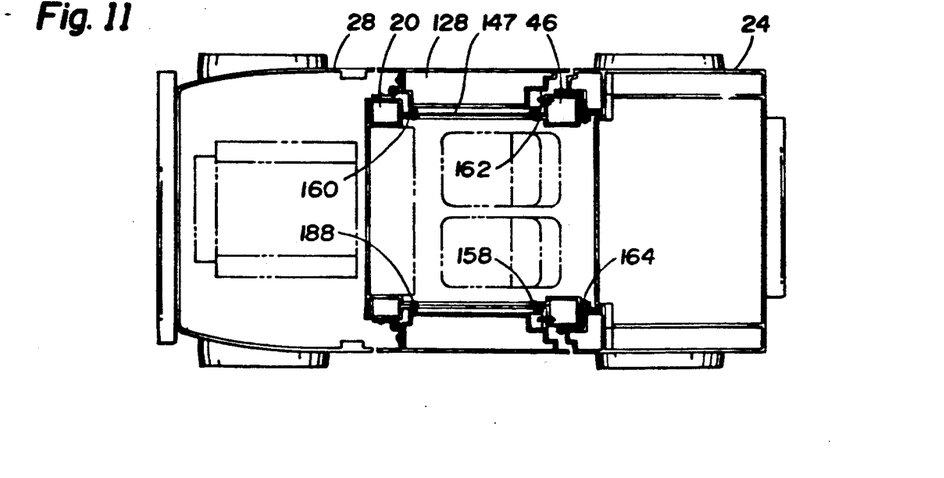
FIG. 11 is a sectional plan view of the vehicle shown in FIG. 10.

As shown in FIGS. 10 and 11, the modules can also be constructed to resemble more conventional construction in which separate body panels are mounted closely adjacent to each other on a vehicle chassis. For such an appearance, modules 24 and 28 and other body panels such as the doors 128 can include exterior panel portions which overlap the structures forming the passenger cage. For example, as shown in FIG. 11, a leading portion of the door panel 128 is closely aligned with a trailing portion of the module 28 and both panels overlap the cowl module pillar at 20. Similarly, the trailing portion of the door panel 128 is closely aligned with a leading portion of the module 24, and both overlap the pillar arch 46.

Sealing between and joinder of the modules is further simplified by the use of pinch-weld flanges where the modules and body panels are joined to the underbody module 16. The construction of a pinch-weld flange is best shown in FIG. 6 as previously discussed, and it is to be understood that the term is not limited to its literal meaning, but refers to any flanges formed by mating flanges connected by mechanical, adhesive or other bonds. In the preferred embodiment, the pinch-weld flange 147 extends along the top of the rocker panel 42. A similar continuous pinch-weld flange 160 extends rearwardly from the cowl module 20 in alignment with the pinch-weld flange 147 on the rocker panel 42. Furthermore, a pinch-weld flange 162 at the leading edge of the pillar arch 46 is also aligned with the pinch-weld flange 147.

As best shown in FIG. 8 and 11, the pinch-weld flanges are well adapted to receive a seal element 188 having a substantially U-shaped channel member adapted to receive the pinch-weld flange therein, and including a compressible seal portion exposed for abutting engagement with a body panel such as the door panel 128. Since the pinch-weld flanges 160 and 162 in the preferred embodiment extend peripherally around the cowl module 20 and the pillar arch 46, respectively, the pinch-weld flanges also permit the mounting of roof panels such as the removable roof panels 130 (FIG. 5) with a weathertight seal.

In addition, a pinch-weld flange, such as the pinch-weld flange 164 on the rear side of the pillar arch 46, can be used to fixedly mount the module 24 to the first module 16. Thus, as shown in FIG. 11, the pinch-weld flange and the rear facing surface of the pillar 46 can be the angularly oriented bonding surfaces adapted to mate with the corresponding surfaces 167 and 165, (see also FIG. 3) respectively, of the module 24. Furthermore, where the module 24 includes a portion which overlaps the peripheral surface 43 of the pillar arch 46, as shown in FIG. 8, additional bonding surfaces for mounting the module 24 to the underbody module 16 can be utilized. Furthermore, pinch-weld flanges supporting a seal member can also be used to guide displacement of the body module 28 with respect to the underbody module 16.

Having thus described the present invention, many modifications thereto will become apparent to those skilled in the art to which it pertains without departing from the scope and spirit of the present invention as defined in the appended claims.

What is claimed is:

1. A method of constructing a motor vehicle comprising:
   fabricating a first module comprising mounting a passenger platform having upper and lower panels to a chassis frame;
   wherein said step of fabricating said first module further comprises securing at least two elongated rails of the chassis frame intermediate and to said upper and lower panels of the passenger platform with each of said elongated rails projecting longitudinally outwardly from said upper and lower panels of said passenger platform;
   fabricating a second module comprising integrally constructing a lower dash cowl having a lower dash panel frame and an upper windshield frame;
   fabricating a third module comprising securing two first side wall structures to opposite sides of a flooring platform and mounting at least one closure means intermediate said first side wall structures for at least selectively enclosing an area above said flooring platform;
   fabricating a fourth module comprising supporting a pair of second side wall structures with reinforcement means in a fixed, spaced relationship with respect to each other, supporting a hood panel on said second side wall structures, and displaceably mounting at least a portion of said fourth module with respect to said first module;
   installing a set of vehicle components on at least one of said first, second, third and fourth modules, and after said installing step, mounting said second, third and fourth modules on said first module; and
   said mounting step comprising a plurality of sequential mounting steps for attaching each module sequentially in a final assembly line.

2. The invention as defined in claim 1 wherein said installing step comprises:
   installing a first set of vehicle components on said first module;
   installing a second set of vehicle components on said second module;
   installing a third set of vehicle components on said third module; and
   installing a fourth set of vehicle components on said fourth module.

3. The invention as defined in claim 2 wherein each said fabricating step and the respective installing step for each module comprises a first set of a plurality of sequential steps in an individual subassembly line.

4. The invention as defined in claim 3 wherein said first set of sequential steps for at least one said module is performed independently and remotely from other said first sets of sequential steps for the other modules.

5. The invention as defined in claim 3 wherein a terminal step of each said first set of steps comprises a sequential input step to a single final assembly line.

6. A method of constructing a motor vehicle comprising:
   fabricating a first module comprising mounting a passenger platform to a chassis frame;
   fabricating a second module comprising integrally constructing a cowl having a lower dash panel frame and an upper windshield frame;
   fabricating a third module comprising securing two first side wall structures to a flooring platform and mounting a closure means intermediate said first side wall structures for at least selectively bordering an area above said flooring platform;
   fabricating a fourth module comprising fixedly securing a pair of second side wall structures in a fixed, spaced relationship with respect to each other, and entraining a hood panel with respect to said second side wall structures;
   installing a set of vehicle components on at least one of said first, second, third and fourth modules, and after said installing step, mounting said second, third and fourth modules on said first module including mounting at least a portion of said fourth module for selective displacement with respect to said first module;
   said mounting step comprising a plurality of sequential mounting steps for attaching each module sequentially in a final assembly line including
   arranging a plurality of drive train components on a carriage in positions corresponding to the relative positions occupied by the components in an assembled vehicle,
   displacing said carriage toward a first module,
   removing said drive train parts form said carriage and mounting said parts to said first module, and
   recycling said carriage to receive an additional arrangement of drive train parts.

7. A method of constructing a motor vehicle comprising:
   a. fabricating a first module comprising mounting a passenger platform having upper and lower panels to a chassis frame, said step of fabricating said first module further comprising securing at least two elongated rails of the chassis frame intermediate and to said upper and lower panels of the passenger platform, with each of said elongated rails projecting longitudinally outwardly form said upper and lower panels of said passenger platform, and including fabricating a pillar arch and attaching the ends of said pillar arch to said passenger platform;

b. fabricating a second module comprising integrally constructing a lower dash cowl having a lower dash panel frame and an upper windshield frame;

c. fabricating a third module comprising securing two first side wall structures to opposite sides of a flooring platform and mounting at least one closure means intermediate said first side wall structures for at least selectively enclosing an area above said flooring platform;

d. fabricating a fourth module comprising supporting a pair of second side wall structures in a fixed spaced relationship with respect to each other, supporting a hood panel on said second side wall structures, and displaceably mounting at least a portion of said fourth module with respect to said first module;

e. fabricating a means for supporting said pillar arch at a fixed position with respect to said lower dash cowl;

f. encaging the area above said passenger platform by attaching said second module to said first module at one end of said passenger platform, and securing said means for supporting to said pillar arch and said second module at a position spaced above said passenger platform; and g. mounting said third and fourth modules on said first module.

8. The invention as defined in claim 7 wherein said means for supporting comprises a cross bar and said securing step comprises securing one end of said cross bar at the top of said windshield frame and securing the other end of said cross bar at the top of said pillar arch.

9. The invention as defined in claim 7 wherein said method further comprises applying a finish coating to at least said first and second modules and said pillar arch simultaneously.

10. The invention as defined in claim 9 wherein said applying step precedes said encaging step.

11. The invention as defined in claim 9 wherein said applying step comprises painting.

12. A method of constructing a motor vehicle comprising:

fabricating a first module comprising mounting a passenger platform having upper and lower panels to a chassis frame;

wherein said step of fabricating said first module further comprises securing at least two elongated rails of the chassis frame intermediate and to said upper and lower panels of the passenger platform, with each of said elongated rails having ends projecting longitudinally outwardly from said upper and lower panels fabricating a second module comprising integrally constructing a lower dash cowl having a lower dash panel frame and an upper windshield frame;

fabricating a third module comprising securing two first side wall structures to opposite sides of a flooring platform and mounting at least one closure means intermediate said first side wall structures for at least selectively enclosing an area above said flooring platform;

fabricating a fourth module comprising supporting a pair of second side wall structures with reinforcement means in a fixed, spaced relationship with respect to each other, supporting a hood panel on said second side wall structures, and displaceably mounting at least a portion of said fourth module with respect to said first module;

fabricating a pillar arch and supporting said pillar arch in a fixed position with respect to said cowl; and finishing at least said first and second modules and said pillar arch simultaneously, and mounting said second, third and fourth modules on said first module.

13. The invention as defined in claim 12 wherein said finishing step comprises painting each said module simultaneously prior to said mounting step.

14. The invention as defined in claim 12 and further comprising:

installing a plurality of vehicle components to at least one of said first and second modules intermediate said painting step and said mounting step.

15. A method of constructing a motor vehicle comprising:

a. fabricating a first module comprising mounting a passenger platform to a chassis frame;

b. fabricating a second module comprising integrally constructing a cowl having a lower dash panel frame and an upper windshield frame;

c. fabricating a third module comprising securing two first side wall structures to a flooring platform and mounting a closure means intermediate said first and said wall structures for at least selectively bordering an area above said flooring platform;

d. fabricating a fourth module comprising fixedly securing a pair of second side wall structures in a fixed, spaced relationship with respect to each other, and entraining a hood panel with respect to said second side wall structures;

e. fabricating a pillar arch and means for supporting said pillar arch in a fixed position with respect to said cowl;

f. finishing at least said first and second modules and said pillar arch simultaneously, and mounting said second, third and fourth modules on said first module;

g. said finishing step comprising painting each said module simultaneously prior to said mounting; and h. arranging one of each of said first, second, third and fourth modules on a single carriage prior to said painting step.

16. The invention as defined in claim 5 and further comprising, after said painting step, sequentially removing each module from said carriage at one of a plurality of separate subassembly lines; and installing a plurality of vehicle components to the respective module at each said one separate subassembly line to form a completely assembled module at the end of each said subassembly line.

17. The invention as defined in claim 16 wherein said installing step comprises a first set of a plurality of sequential steps.

18. The invention as defined in claim 17 wherein said mounting step comprises a second set of a plurality of sequential steps on a final assembly line.

19. The invention as defined in claim 18 wherein a terminal step of each said first set comprises a sequential input step in said final assembly line.

* * * * *

UNITED STATES PATENT AND TRADEMARK OFFICE
CERTIFICATE OF CORRECTION

PATENT NO. : 5,090,105
DATED : February 25, 1992
INVENTOR(S) : Delbert D. DeRees It is certified that error appears in the above-identified patent and that said Letters Patent is hereby corrected as shown below:

Column 1, line 59, (second occurrence), delete "."
Column 4, line 49, "-each" should be --each--.
Column 6, line 16, "each-" should be --each--.
Column 8, line 31, delete "." .
Column 9, line 44, "a" should be --an--.
Column 10, line 1, (first occurrence), "as" should be --be--.
Column 10, line 61, "-hood" should be --hood--.
Column 11, line 60, "company" should be --companion--.
Column 14, line 57, claim 6, "form" should be --from--.
Column 15, line 2, claim 7, "form" should be --from--.
Column 15, line 57, claim 12, after "panels" insert --;--.
Column 16, line 31, claim 15, "and said" should be --side--.
Column 16, line 50, claim 16, "5" should be --15--.

Signed and Sealed this

Tenth Day of August, 1993

Attest:

MICHAEL K. KIRK

Attesting Officer

Acting Commissioner of Patents and Trademarks